M. F. WILFONG.
CONTAINER FOR METALLURGICAL PURPOSES.
APPLICATION FILED JULY 25, 1910.

984,986.

Patented Feb. 21, 1911.

WITNESSES:
G. G. Trill
Harold G. Jones

INVENTOR
Millard F. Wilfong
by Dennis S. Wolcott Atty

UNITED STATES PATENT OFFICE.

MILLARD F. WILFONG, OF PHILADELPHIA, PENNSYLVANIA.

CONTAINER FOR METALLURGICAL PURPOSES.

984,986.  Specification of Letters Patent.  Patented Feb. 21, 1911.

Application filed July 25, 1910. Serial No. 573,794.

*To all whom it may concern:*

Be it known that I, MILLARD F. WILFONG, residing at Philadelphia, in the county of Philadelphia and State of Pennsylvania, a citizen of the United States, have invented or discovered certain new and useful Improvements in Containers for Metallurgical Purposes, of which improvements the following is a specification.
Heretofore certain kettles for galvanizing have been constructed with trough shaped body portions, semi-circular or rectangular in cross section and having the heads or ends flanged and fitting within the body portion and secured in place by rivets or bolts passing through the flanges of the heads and the plate or plates forming the body. In lieu of riveting or bolting, the heads have been secured by welding the flanges to the body.
During the operation of galvanizing the bath is ordinarily heated to a temperature at which the kettle is a dull red and when the production is forced the temperature is still higher. Under such conditions it has been found to be practically impossible to maintain the joints sufficiently tight to prevent the escape of spelter.

The invention described herein has for its object the maintenance of the joints and the parts of the kettle adjacent thereto at a temperature below that at which injurious effects on the joints are produced.

Figure 1:
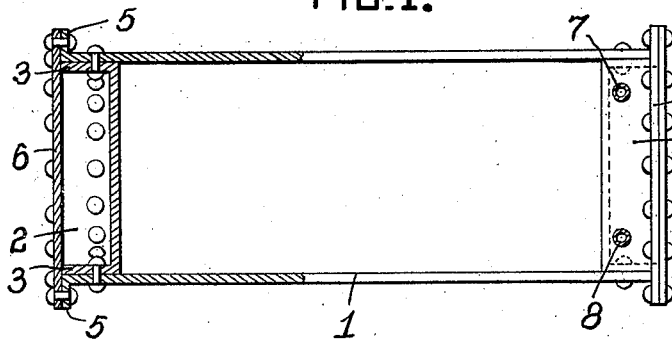
Figure 2:
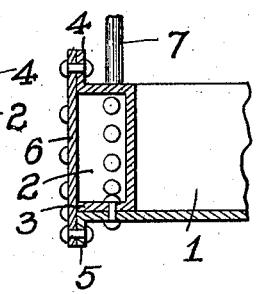
Figure 3:
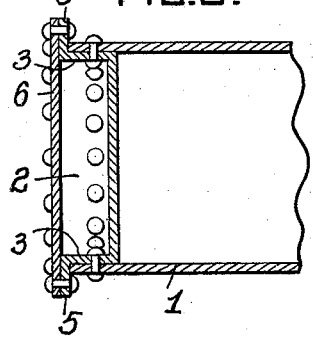
Figure 4:
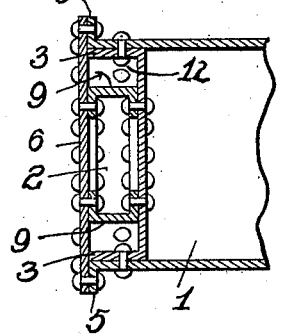
Figure 5:
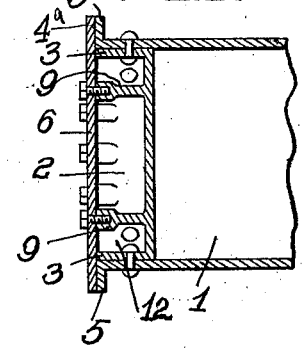
Figure 6:
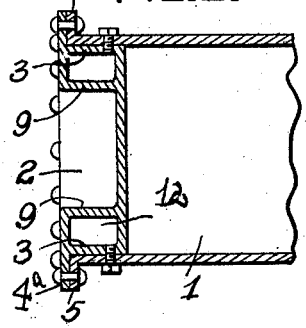
Figure 7:
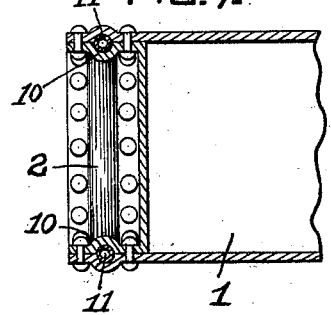
Figure 8:
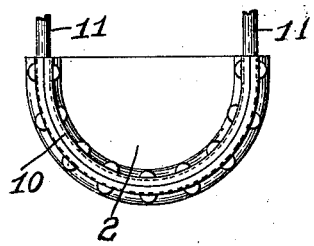

The invention is hereinafter more fully described and claimed.
In the accompanying drawing forming a part of this specification Figure 1 is a plan view partly in section of a galvanizing vessel embodying my improvement; Fig. 2 is a sectional elevation of an end portion of the kettle; Fig. 3 is a sectional plan view of one end of the kettle showing an alternative way of attaching the head and body; Figs. 4, 5 and 6 are views similar to Fig. 3 illustrating modifications in the construction of the head; Fig. 7 is a sectional plan view illustrating a further modification of my improvement and Fig. 8 is an end elevation of a kettle embodying the construction shown in Fig. 7.
In the practice of my invention the bath-containing vessel, which is usually termed a kettle, may be of any desired shape or construction and preferably consists of a body portion 1 and heads 2 secured to the body by riveting, bolting, welding, or in any other suitable way. While the body portion is preferably formed of a suitably bent plate of metal, it may be formed of two or more plates secured together by riveting or otherwise provided the joints between such plates are protected as hereinafter described. When a form of kettle such as shown in Fig. 1 requiring heads or end pieces, is desired the heads or ends 2 are provided with means for preventing an injurious heating of the joints between the heads and body. In adapting the construction of kettle heretofore employed to my improvement the heads are formed with a peripheral flange 3, which will bear against the inner wall of the body of the kettle, the flange 3 and the body being secured together in any suitable way known in the art, as by rivets, bolts etc. In the construction shown, the heads are set in sufficiently far to permit portions at the ends of the body to be turned or flanged out forming lips 5 and a lip 4 is also formed on the flange 3 on the upper edge of the head. To these lips 4 and 5 a plate 6 is riveted or otherwise secured, thereby forming chambers at the ends of the kettle for the reception of a cooling medium, as water, said chambers being provided with supply and outlet pipes 7 and 8.

As shown in Fig. 3, the lips to which the plates 6 are secured, may be formed entirely on the flanges 3 of the heads. As shown in Figs. 5 and 6 the heads may be formed of cast metal, the lip $4^a$ extending outwardly in a plane parallel with the end wall of the head, to permit of their being attached to outwardly turned flanges on the body portion.

In lieu of cooling the entire head the latter may be formed with channels 12 closely adjacent to edges where the heads are secured to the body portion, as it is only necessary to protect the joints or seams of the vessel from excessive heating. In the construction shown in Fig. 4 the channels or passages 12 are formed by securing channel bar 9 in any suitable manner within the hollow heads. When the heads are formed of cast metal as shown in Fig. 5 the portions 9 may be integral with the main part of the head and the end plate or cover 6 secured by bolts entering the partitions. In Fig. 6 is shown a construction where the head is made of a single thickness and having passages formed in its edges.

In lieu of forming the cooling chambers or channels in the heads, a passage formed by a pipe or otherwise for the flow of the cooling medium, may be arranged in such relation to the joints or seams as to prevent injurious heating. This construction can be readily applied to kettles as at present constructed by so forming grooves 10 in the inner wall of the body and in the outer wall of the flanges 3 of the heads, that when the latter are placed in position the grooves will coincide, forming passages for the flow of the cooling medium. While the joints on each side of these passages might be made sufficiently tight, it is preferred that a bent section of pipe 11 be inclosed in the grooves, thereby avoiding any liability of leakage in case the joints of the kettle should open slightly.

As will be readily understood by those skilled in the art the circulation of a cooling medium adjacent to or along the joints or seams of the kettle, will prevent the walls of the kettle from becoming so affected as to open. In case the inner portion of the seams or joints in contact with the molten metal should open enough to allow of the inflow of molten metal, the latter will solidify after flowing a short distance into the joints where the walls are cooler. This solidification will certainly occur where the cooling medium flows through passages in the joints or seams and thereby form a packing consisting of the metal of the bath, for the joints or seams.

While my improvements are especially applicable to kettles for galvanizing, it will be readily understood that such improvements are applicable to containers for other metallurgical purposes, where the container which is subjected when in use to high temperatures consists of non integral parts which are united by bolts or rivets, etc.

I claim herein as my invention—

1. An externally heated container for metallurgical purposes having non-integral parts permanently united by bolts or rivets in combination with means forming a portion of the structure of the container for preventing an opening of the joints when subjected to high heat and pressure.

2. An externally heated container for metallurgical purposes having non-integral parts permanently united by bolts or rivets in combination with means forming a portion of the structure of the container for preventing the injurious heating of the joints or seams of the container.

3. An externally heated container for metallurgical purposes consisting of non-integral parts united by bolts or rivets in combination with means incorporated in the structure of the container for applying a cooling medium to its joints without materially reducing the area to which heat is to be applied.

4. A container for metallurgical purposes having in combination a body portion, heads riveted or bolted to the body portion and means incorporated in the structure of the container for preventing injurious heating of the joints or seams between the body portion and the heads.

5. A container for metallurgical purposes consisting of parts united by bolts or rivets and having incorporated in its joints or seams a passage for the flow of a cooling medium.

6. A container for metallurgical purposes having in combination a body portion and heads bolted or riveted to the body portion and having passages therethrough for the flow of a cooling medium.

In testimony whereof, I have hereunto set my hand.

MILLARD F. WILFONG.

Witnesses:
JOHN J. FOSTER,
BERTHA SCULL.